A. COOLEY.
HOLDING KNIFE HANDLES FOR SOLDERING.
No. 26,323. Patented Nov. 29, 1859.
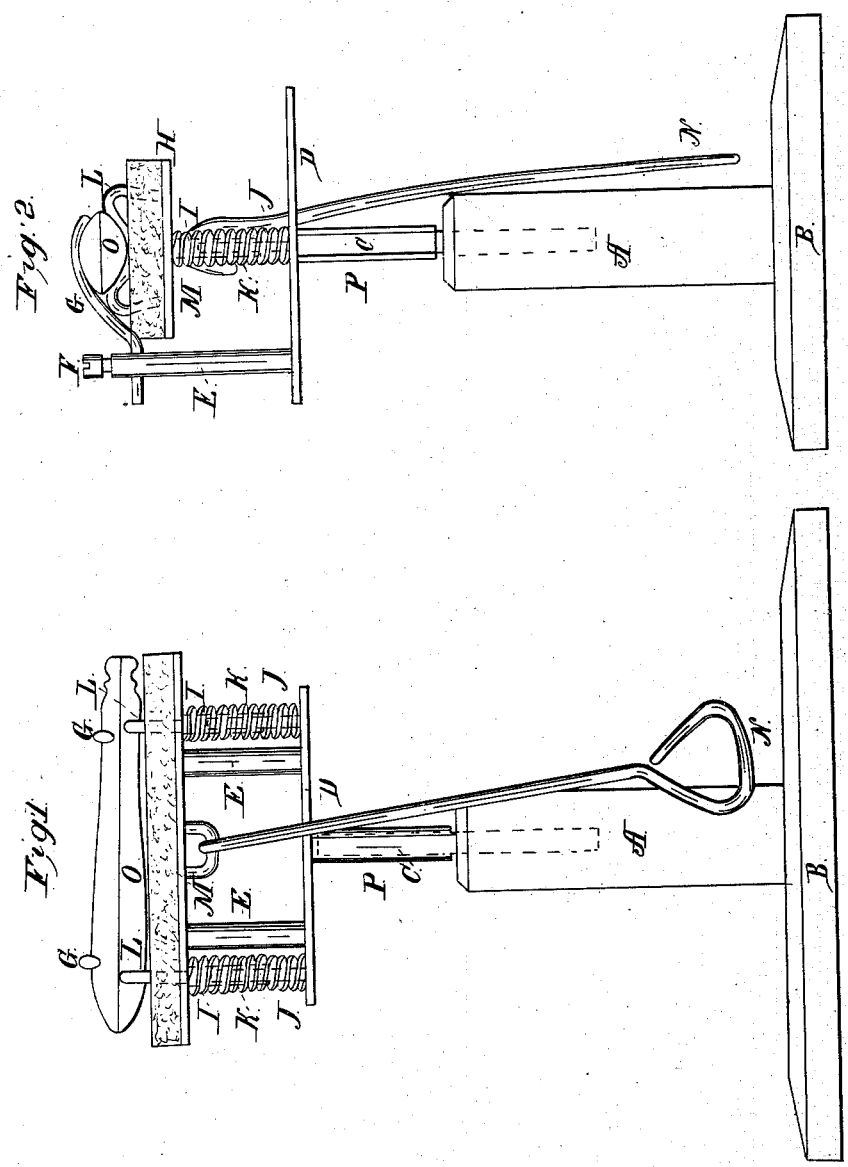

UNITED STATES PATENT OFFICE.

ALMON COOLEY, OF HARTFORD, CONNECTICUT, ASSIGNOR TO E. W. SPERRY, J. H. ASHMEAD, EMANUEL HURLBERT, AND HENRY E. ROBINS, ALL OF SAME PLACE.

HOLDING KNIFE-HANDLES FOR SOLDERING.

Specification of Letters Patent No. 26,323, dated November 29, 1859.

*To all whom it may concern:*

Be it known that I, ALMON COOLEY, of Hartford, county of Hartford, and State of Connecticut, have invented certain new and useful Improvements in Devices for Securing Handles, &c., for Soldering; and I do hereby declare that the same is described and represented in the following specification and drawings; and to enable others skilled in the art to make and use my improvement I will proceed to describe its construction and operation, referring to the drawings, in which the same letters indicate like parts in each of the figures.

The nature of this improvement in devices for securing or holding handles, &c., for soldering consists, first, in the use or employment of yielding clamps to hold the two halves of a handle in the proper position for soldering; second, in arranging yielding clamps upon a turn table or its equivalent so as to turn or accommodate itself to the blaze, while the soldering is being done.

In the accompanying drawings, Figure 1 is a side elevation. Fig. 2 is an end elevation.

A, is an upright post, secured in a bed piece B, or to the floor, wherever desirable for use, having a fulcrum pin C, on which the device is supported and turns.

D, is a turn table, having a tube P secured to the underside by which it is held and allowed to turn on the pin C. Said table is (without its upper work) much like what is used commonly for laying work on for soldering.

E are upright posts secured on the upper surface of the turn table D, having set screws F in the upper end, and perforated holes through said posts, near the upper end to receive the brackets G, which are held in the desired position by the set screws F.

H is a bed-plate having tubes I, secured on the under side of a corresponding distance apart, with the pins J on the upper side of the turn table D. The said plate H, is held in place by the tubes I, being placed on the pins J, and is actuated by the springs K placed over said tubes and pins I, J. On the upper side of the bed-plate H, are secured two or more crooked brackets L made in a required shape.

M is a pumice-stone or other suitable substance to concentrate the heat of the blaze, fitted onto the bed-plate H, between, or around the brackets L.

N, is a stirrup connected to the underside of the bed-plate H.

O, is a handle placed between the brackets L and G, in readiness for soldering.

In using this improvement, the person using it, first places his foot in the stirrup N, and bears down, which in so doing, opens the clamps or brackets. Then the handle is placed on or between the brackets L, G,—(the brackets G first having been adjusted, by means of the set-screws F, to the upper side of the handle O,) the foot is removed, and the work is ready to be soldered.

I am aware that the parts may be differently arranged, and some of the parts differently constructed, while the essential feature still remains, viz., adjusting and holding the handle (being in two parts) between yielding clamps, or brackets, while the soldering is being done, and at the same time held in such a manner as to accommodate itself to the heat of the blaze.

The advantage to be derived by this improvement over the old way of wiring the handle for soldering will be clearly seen and understood from the following: It takes about ten hours to wire one gross of handles, and one and a half ounces of solder at a cost of ninety cents per ounce. By this improvement I can do the whole work of soldering for three gross in ten hours, with three-fourths of an ounce of solder much easier, and am more sure of having perfect work.

I believe I have thus described the nature, construction, and operation of my improvement, together with some of the advantages to be derived, so as to enable a person skilled to make and use the same.

What I claim, therefore, and desire to secure by Letters Patent, is—

1. The above described device for securing, or holding, handles (formed of two parts), &c., for soldering, or their substantial equivalents.

2. The adjustable, yielding, clamps or brackets G, L, substantially in the manner for the purpose described.

3. The combination of the yielding clamps or brackets G, L, with a turn table D or their substantial equivalents substantially in the manner as and for the purpose described.

ALMON COOLEY. [L. S.]

Witnesses:
 SAML. I. TUTTIS,
 JERMY W. BLYS.